United States Patent
Tedesco et al.

(10) Patent No.: US 6,349,295 B1
(45) Date of Patent: Feb. 19, 2002

(54) METHOD AND APPARATUS FOR PERFORMING SUPPLEMENTAL SEARCHES OVER A NETWORK

(75) Inventors: Daniel E. Tedesco, New Canaan; Jay S. Walker, Ridgefield, both of CT (US); Marc D. Kessman, Brewster, NY (US)

(73) Assignee: Walker Digital, LLC, Stamford, CT (US)

( * ) Notice: Subject to any disclaimer, the term of this patent is extended or adjusted under 35 U.S.C. 154(b) by 0 days.

(21) Appl. No.: 09/223,899

(22) Filed: Dec. 31, 1998

(51) Int. Cl.[7] .............................................. G06F 17/30
(52) U.S. Cl. ............................................. 707/3; 707/10
(58) Field of Search ............................... 707/3, 4, 5, 2, 707/10

(56) References Cited

U.S. PATENT DOCUMENTS

| | | |
|---|---|---|
| 5,638,504 A | 6/1997 | Scott et al. |
| 5,715,469 A | 2/1998 | Arning |
| 5,727,950 A | 3/1998 | Cook et al. |
| 5,754,939 A | 5/1998 | Herz et al. |
| 5,796,952 A | 8/1998 | Davis et al. |
| 5,802,380 A | 9/1998 | Bangs et al. |
| 5,873,107 A | 2/1999 | Borovoy et al. |

OTHER PUBLICATIONS

"Clear Ink", Clear Ink Corp. (http://www.clearink.com/spellweb), copyright date: 1995.
Brochure: "CiteRite II Features & Benefits", Lexis–Nexis, copyright date: 1995.
Brochure: "Full Authority Features & Benefits", Lexis–Nexis, copyright date: 1995 printed pp. 4–5.
"Nerds' English", The Economist, Jul. 15, 1995 at p. 72.
"Spell Check 3.8 for Windows", Next Generation Software, Inc., copyright date: 1996 printed pp. 1–2.
"Products & Services Information Professional Update", Lexis–Nexis printed pp. 1–12, 1996.
Peter D. McKay, "Establishing a Corporate Style Guide: A Bibliographic Essay", Technical COmmunication, Aug. 1997 at p. 244. Printed pp. 1–9.

(List continued on next page.)

*Primary Examiner*—Frantz Coby
(74) *Attorney, Agent, or Firm*—Dean P. Alderucci

(57) ABSTRACT

A method and apparatus are disclosed for cooperating with a first software program to perform a supplemental search over the Internet or another public network. A supplemental search is performed in the background to obtain desired information, while the user continues the primary task of creating, for example, a document. The user does not have to divert his or her attention from the primary task of creating the document to manually initiate a search. An illustrative word processing application program spawns a background thread in a multithreaded environment to perform the supplemental search using a browser, while the word processing application program maintains continuous control until the search results are obtained and viewed by the user. A supplemental search can be performed on a given topic (i) when requested by a user, or (ii) automatically, if a predefined condition, such as the occurrence of an apparently improper data element that fails to satisfy the requirements of a spelling or grammar database, is detected in a document of an application program. Thus, the invention can be configured to perform Internet-based spelling or grammar checking and automatically detect the adoption of new words or phrases and changes in acceptable grammar usage. In addition, the word processing application program automatically determines if a document being created corresponds to one or more predefined categories. If a document being created corresponds to a predefined category, the document can optionally be provided to an expert associated with said identified category for review.

76 Claims, 13 Drawing Sheets

OTHER PUBLICATIONS

Jim Hourigan and Kim Davis, "New Version of LEXIS–N-EXIS Office for WINDOWS to Feature Microsoft Internet Explorer" 27, 1997 printed pp. 1–2.

Kim Davis and Judi Schultz, "LEXIS–NEXIS Standardizes on Microsoft Platform", May 19, 1997 printed pp. 1–2.

"LEXIS–NEXIS Command Guides", Lexis–Nexis copyright date: 1998 printed pp. 1–18.

"Cite Check Product Information", Lexis–Nexis copyright date: 1998 printed pp. 1–3.

James Coates, "Microsoft's Antitrust Battle COuld Reshape Windows 98", The Buffalo New, Jan. 31, 1998 at p. 9B.

Douglas D. Armstrong, "Windows 98 Offers Familiar View", Milwaukee Journal Sentinel, Feb. 2, 1998 at p. 13.

"Connected: Web Spell Checker", The Daily Telegraph, Feb. 19, 1998 at p. 2.

"Internet Statistics", AdNet Advertising, Aug. 18, 1998.

"Visual FoxPro Resource Guide", Microsoft, download date: Oct. 20,1998 printed p. 1.

"Microsoft Word for Windows Data Sheet", Microsoft download date: Oct. 20,1998 printed p. 1.

"Platform and Tools for Intranet Applications", Microsoft, download date: Oct. 20, 1998 printed pp. 1–11.

"Office 2000 Preview" Microsoft, download date: Oct. 20, 1998 printed pp. 1–3.

"Word Processing Features", HoT MetaL PRO, Aug. 19, 1998 printed pp. 1–5.

"Spell Check Anything Anywhere in Windows", ABC Spellchecker, Aug. 19, 1998 printed pp. 1–2.

Carol LaBorde, "Spell Check Grayed Out in 7.0", DBasics Software Company, copyright 1997 printed p. 1.

"Microsoft Proofing Tools for Office 97", ALKI Software Corporation, copyright 1997 printed pp. 1–3.

"hSoft, Inc. Software Publisher", hSoft, Inc., copyright 1998 printed p. 1.

"WordScribe Spell Check", hSoft Inc., copyright date: 1996.

"Smart Browsing", Netscape Inc., copyright date: 1998.

"The Arabic Spell Checking Module", Arabic Information Systems, copyright date: 1998 printed pp. 1–2.

Spell Check Slide 28 of 40, download date: Aug. 19, 1998 printed p. 1.

"The Consummate Winsock Apps List", iWorld, 1997 printed pp. 1–4.

"Spell Check 3.8", DaveCentral Software Archives, Aug. 19, 1998 printed p. 1.-

PROCESS IDENTIFIER (PID) DATABASE 300

| PROCESS IDENTIFIER 330 | PROCESS TYPE 335 | TASK 340 | MEMORY SEGMENT 345 |
|---|---|---|---|
| 00 | MS WORD APPLICATION | CREATE DOCUMENT | 0010-0100 |
| 01 | NETSCAPE BROWSER | DATA SEARCHING | 1011-1100 |
| • • • | • • • | • • • | • • • |
| FE | MS EXCEL APPLICATION | CREATE SPREADSHEET | A000-A100 |
| FF | NETSCAPE BROWSER | EVALUATE USAGE | FE00-FF00 |

FIG. 3

METHOD AND APPARATUS FOR PERFORMING SUPPLEMENTAL SEARCHES OVER A NETWORK

FIELD OF THE INVENTION

The present invention relates generally to tools for improving the efficiency of software programs, such as word processing programs and spreadsheet programs, and more particularly, to a method and apparatus for cooperating with such software programs to perform supplemental searches over the Internet or another public network.

BACKGROUND OF THE INVENTION

Commercially available software programs, such as word processing programs and spreadsheet programs, include a number of features and tools that increase user efficiency. As such software programs have become more sophisticated with each new release, manual tasks have generally become more automated and utilization of the software has become easier. For example, the Microsoft Word™ word processing program from Microsoft Corporation of Redmond, Wash. includes an AutoCorrect feature that uses shortcuts to insert frequently used text and graphics and to automatically correct a number of frequent errors, such as the accidental usage of the "capitals lock" key on the keyboard.

Similarly, the AutoFormat feature in Microsoft Word™ works "in the background" (i.e., substantially separate from other functions of the program and/or absent interaction with the user) to automate a number of formatting tasks, while the user focuses on the document content. Specifically, the AutoFormat feature analyzes each paragraph to determine how the paragraph is used in a document. For example, the AutoFormat feature may determine whether a given paragraph is used as a heading or as an item in a numbered list. Thereafter, the AutoFormat feature applies a style that is appropriate for the identified item. In addition, the Auto-Formnat feature automatically formats Internet, network, and e-mail addresses as hyperlink addresses.

There is a vast amount of information available on the World Wide Web (the "Web" ) and other public networks. Anyone who is connected to the Internet and has a browser, such as Netscape Navigator Communicator™, commercially available from Netscape Communications Corporation of Mountain View, Calif., can access information on the Web. Generally, to access desired information, a browser is used to access a web site with a known uniform resource locator ("URL" ) address directly, or to access a search engine, such as Yahoo!™ or Alta Vista™, that can identify other web sites containing relevant information. If the user accesses a search engine, the user enters keywords directing a search on a desired topic and the browser receives the search results from the search engine for presentation to the user. Generally, the search results comprise a set of hyperlinks pointing to web sites containing relevant information. While helpful information can often be found in this manner, the process can be quite slow.

Thus, a number of techniques have been proposed for improving the access time for Internet resources, from the user's point of view. Pre-fetching strategies, for example, attempt to load documents into a client application before the user has actually selected any of these documents for browsing. When a user selects a hyperlink in a currently viewed document, or identifies a document using a uniform resource locator ("URL") address, the addressed document may have already been pre-fetched and stored (e.g., cached) on or near the user's machine, thus reducing the document access time observed by the user.

In addition, multitasking allows a user to run several programs simultaneously, which can each be viewed and managed by the user through a single graphical user interface (GUI). For example, a user can initiate an Internet search using a browser and then return to operating a word processing program in another window. Although both programs are open on the desktop simultaneously, and the user can switch between applications, the user only actively uses one program at a time. Specifically, the one program that is currently affected by user commands and data entry is deemed to be in the "foreground," while any other programs are in the background.

There is currently little, if any, integration between browsers and other commercially available software programs, such as word processing programs. Thus, if a user of a word processing program desires to obtain information from the Web for use in a document the user is creating, the user must divert his or her attention from the primary task of creating the document to manually initiate a search. Generally, the user must (i) suspend working in the word processing environment, (ii) ensure an active connection to the Internet, (iii) manually initiate the browser application and enter the search terms for the desired topic, and (iv) await the search results. After the search results are obtained and processed, the user must regain his or her train of thought and resume the primary task of creating the document. Thus, a need exists for a word processor that facilitates the supplemental searching performed by a user.

In addition, the spelling and grammar check features of conventional word processing programs have not been fully integrated with browsers and other Internet tools. Thus, the spelling and grammar check features suffer from a number of limitations, which, if overcome, could greatly increase the utility and efficiency of such features. Specifically, the spelling and grammar check features compare a document against a predefined database to identify improper usage. Since new words and phrases are continuously adopted and acceptable grammar usage will change over time, the predefined databases used by the spelling and grammar check features become quickly outdated. While conventional word processing programs often include a mechanism to allow users to update the spelling and grammar databases to reflect such changes, there is a need for spelling and grammar check tools that utilize a dynamic database that inherently reflects such changes in common usage.

SUMMARY OF THE INVENTION

Generally, a method and apparatus are disclosed for cooperating with a software program, such as a word processing program or a spreadsheet program, to perform a supplemental search over the Internet or another public network. According to one aspect of the invention, a supplemental search is performed in the background over the Internet or another public network, to obtain desired information while the user continues the primary task of creating a document. In one implementation, an illustrative word processing application program spawns a background thread (corresponding to a process running in the background) in a multithreaded environment to perform the supplemental search using a browser while the word processing application program maintains continuous control until the search results are obtained and viewed by the user.

In one embodiment, a supplemental search can be performed on a given topic when requested by a user. Generally, the user selects a desired data element (e.g., one or more words) in a document and initiates a supplemental search of the data element, for example, by clicking on a toolbar icon, selecting a search command option from a menu or performing a predefined series of keystrokes. The supplemental search is launched in the background and the user continues working in the word processing application program until the search results are received. Thus, the user does not have to divert his or her attention from the primary task of creating the document to manually initiate a search.

In addition, a supplemental search can be performed automatically if a predefined condition is detected in a document of an application program. For example, a supplemental search can be performed to evaluate the usage of an apparently improper data element that fails to satisfy the requirements of a spelling or grammar database associated with the word processing application program. A supplemental search of an apparently improper data element can be launched automatically if the apparently improper data element appears more than a threshold number of times in a document. The supplemental usage search is launched in the background, transparent to the user, and the user continues working in the word processing application program until the search results are received. Thus, the present invention can be configured to perform Internet-based spelling or grammar checking.

Once the search results are received, the present invention determines if the apparently improper data element has been used more than a threshold number of times on remote servers accessed through the public network, such as the Internet. In this manner, the present invention automatically detects the adoption of new words or phrases and changes in acceptable grammar usage. If the apparently improper data element has been used more than a threshold number of times, the user can be queried to update the document to reflect the new usage. In addition, the static spelling or grammar databases associated with the word processing application program can optionally be dynamically updated to reflect such new words or phrases and changes in grammar usage as the content available on a public network changes and grows.

According to another aspect of the invention, the word processing application program automatically determines if a document being created corresponds to one or more predefined categories. If a document being created corresponds to a predefined category, the document can optionally be provided to an expert associated with said identified category for review. The results of the expert review are then provided to the user. The user can be required to guarantee payment for the expert review, for example, using a credit card or a prepaid account, or to otherwise prepay for the expert review. A particular expert can be identified, for example, by accessing a database indicating one or more experts for each predefined category, or by one or more designated experts, such as individuals having predefined qualifications.

A more complete understanding of the present invention, as well as further features and advantages of the present invention, will be obtained by reference to the following detailed description and drawings.

BRIEF DESCRIPTION OF THE DRAWINGS

FIG. 3 is a sample table illustrating an exemplary process identifier (PID) database of FIG. 2;

DETAILED DESCRIPTION

Figure 1:
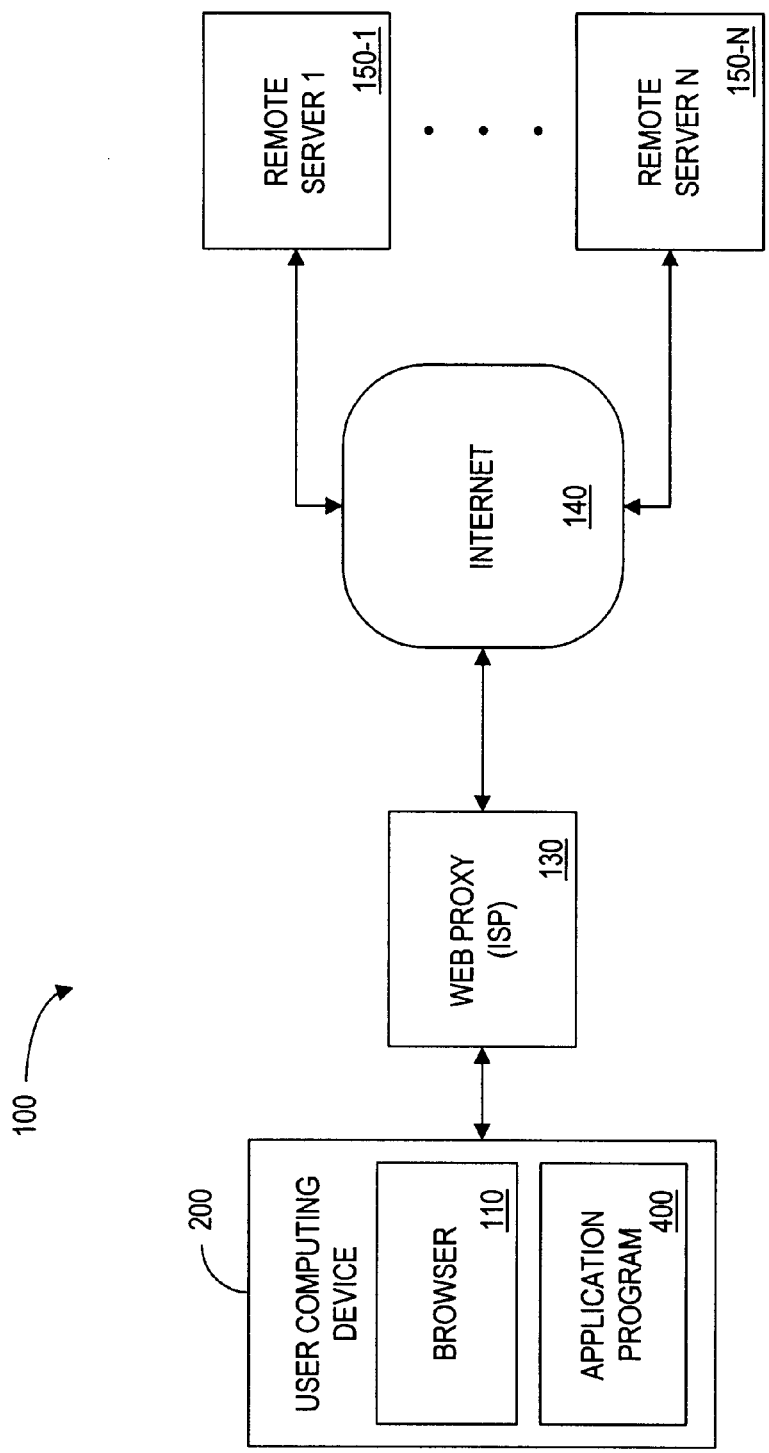
FIG. 1 is a schematic block diagram of a network environment in accordance with the present invention.

FIG. 1 illustrates a network environment 100 in accordance with the present invention. The network environment 100 includes a user computing device 200, discussed below in conjunction with FIG. 2, that includes a Web browser 110 and an application program 400, such as a word processing program or a spreadsheet program. The present invention may be used in any environment where a user obtains Web resources from one or more remote servers, such as servers 150-1 through 150-N, over a publicly accessible network, such as the Internet 140. In the illustrative embodiment, the browser 110 cooperates with a proxy server 130 (or a firewall) of an Internet Service Provider ("ISP") to access the Internet or World Wide Web ("Web") environment 140 to obtain the Web resources from the remote servers 150-N. As discussed further below in conjunction with FIG. 2, the browser 110 and the application program 400 may be independent of each other, as shown in FIG. 1, or may be integrated, as would be apparent to a person of ordinary skill. Web resources are entities that can be requested from a remote server 150-N, including HTML documents, images, audio and video streams and applets.

According to one feature of the present invention, a user of the application program 400 can perform a supplemental search in the background over the Internet 140 or another public network, to obtain desired information, while the user continues the primary task of creating the document. In one implementation, the word processing application program 400 spawns a background thread in a multithreaded environment to perform the supplemental search using the browser 110, while the word processing application program 400 maintains continuous control until the search results are obtained and viewed by the user.

In one embodiment, the word processing application program 400 launches a supplemental search on a given data element when requested by a user. Generally, the user selects a desired data element in a document and initiates a supplemental search of the data element by clicking on a toolbar icon, selecting a search command option from a menu or performing a corresponding predefined series of keystrokes. The supplemental search is launched in the background and the user continues working in the word processing application program 400 until the search results are received. Thus, with the present invention, the user does not have to divert his or her attention from the primary task of creating the document to manually initiate a search.

In a second embodiment of the present invention, the word processing application program 400 launches a supplemental search automatically, for example, to evaluate the usage of an apparently improper data element that fails to satisfy the requirements of a spelling or grammar database associated with the word processing application program 400. In one implementation, a supplemental search of an apparently improper data element is launched automatically if the apparently improper data element appears more than a threshold number of times in a document. The supplemental usage search is launched in the background, transparent to the user, and the user continues working in the word processing application program 400 until the search results are received. In this manner, the present invention can be configured to perform Internet-based spelling or grammar checking.

Once the search results are received, the present invention determines if the apparently improper data element has been used more than a threshold number of times on the remote servers 150-1 through 150-N accessed through the public network 140, such as the Internet. In this manner, the present invention automatically detects the adoption of new words and phrases and changes in acceptable grammar usage. If the apparently improper data element has been used more than a threshold number of times, the user can be queried to update the document to reflect the new usage, and the static spelling or grammar databases associated with the word processing application program 400 can optionally be updated. In a further variation, the supplemental searches for unrecognized words or terms can be batched and executed when the operating system detects that the word processing application program 400 has been inactive for more than an established threshold period of time.

While the accuracy of prior art spelling and grammar checking programs are limited by the size of the corresponding spelling and grammar databases, the accuracy of the present invention is limited only by the content available on the publicly accessible network, such as the Internet. With over sixty million Internet users worldwide, the data available from the Internet is exponentially more abundant and up-to-date than the data available in any static spelling or grammar database. Furthermore, the grammar and spelling usage of actual users more accurately reflects conventional usage, since it is taken from common use as opposed to an interpretation of common usage.

According to another feature of the present invention, the word processing application program 400 automatically determines if a document being created corresponds to one or more predefined categories. If a document being created does correspond to a predefined category, the document can optionally be provided to an expert associated with said identified category for review. For example, a document with repeated occurrences of the term "material evidence" or "modus operandi" may be categorized as a legal document. The results of the expert review are then provided to the user. As discussed further below, the expert can be contacted using the methods and apparatus disclosed, for example, in U.S. patent application Ser. No. 09/112,131 now pending, entitled "Method and Apparatus for a Cryptographically Assisted Commercial Network System Designed to Facilitate and Support Expert-Based Commerce," filed Jul. 08, 1998 assigned of the assignee of the present invention and incorporated by reference herein.

Figure 2:
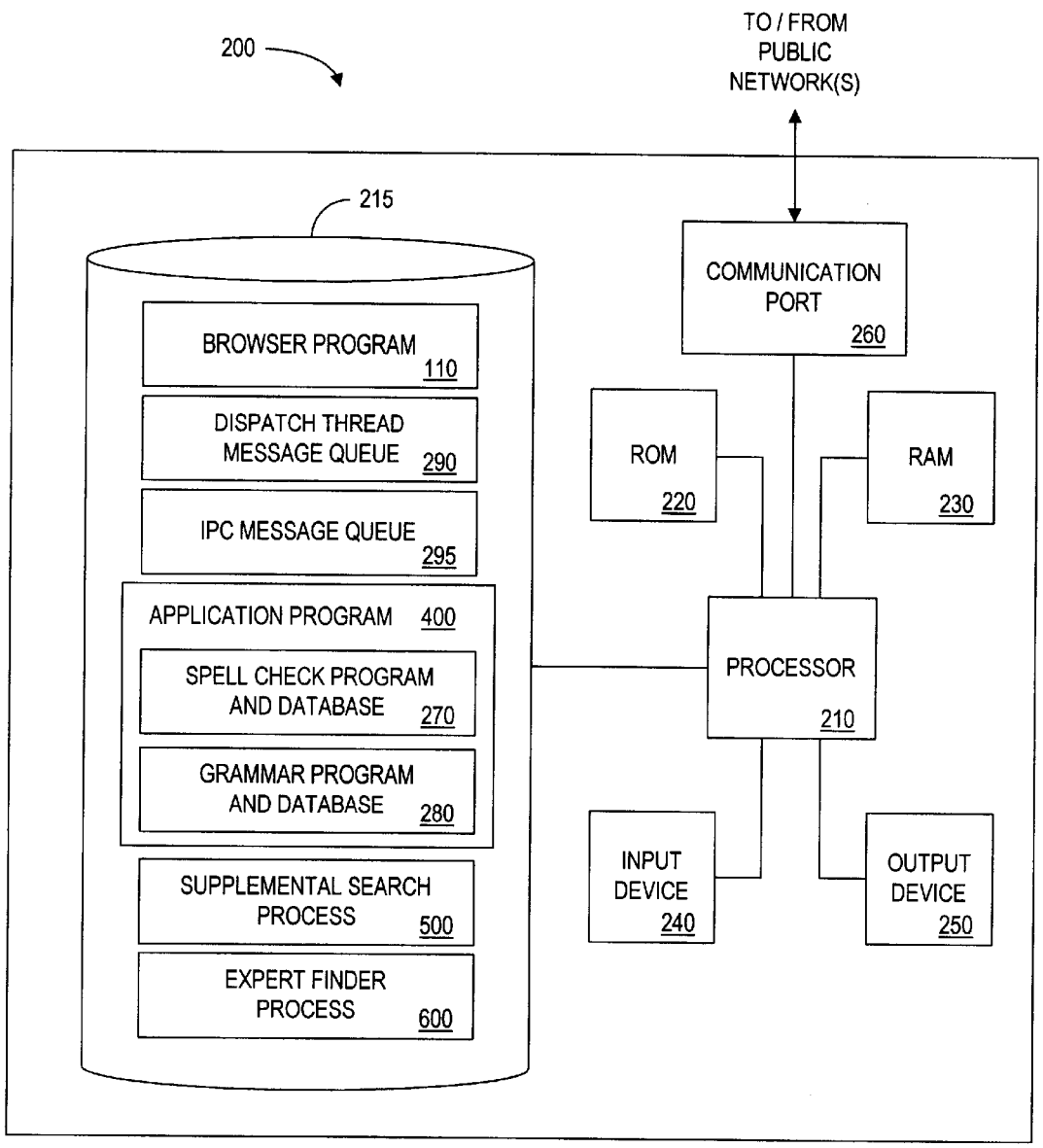
FIG. 2 is a schematic block diagram of an illustrative user computing device of FIG. 1.

FIG. 2 is a block diagram showing the architecture of an illustrative user computing device 200. The user computing device 200 includes a central processing unit (CPU) 210 in communication with a data storage device 215, a read only memory (ROM) 220, a random access memory (RAM) 230, one or more input device(s) 240, one or more output device(s) 250, and a communications port 260. The CPU 210 can be in communication with the data storage device 215, the read only memory (ROM) 220, the random access memory (RAM) 230, the input device(s) 240, the output device(s) 250 and the communications port 2 by means of a shared data bus or dedicated connections, as shown in FIG. 2.

The input device 240 may be embodied, for example, as one or more of a keyboard, mouse, joystick and optical scanner. The output device 250 may be embodied, for example, as one or more of a display, a printer, network interface card (NIC) and an audio output. The communications port 260 connects the user computing device 200 to the public network, such as the Internet 140. The communication port 260 may include multiple communication channels for simultaneous communication with more than one remote terminal and/or server.

As previously indicated, the data storage device 215 includes a browser 110 and an application program 400, discussed further below in conjunction with FIGS. 4A through 4C. The browser 110 may be embodied, for example, as Netscape Navigator™ commercially available from Netscape Communications Corporation of Mountain View, Calif., as modified to configure the browser 110 for a proxy by going, for example, to Edit/Preferences/Advanced/Proxies. In the illustrative embodiment, the application program 400 is embodied as a word processing application, such as Microsoft Word™ commercially available from Microsoft Corporation of Redmond, Wash., as modified herein to incorporate features and functions of the present invention.

As shown in FIG. 2, the word processing application program 400 includes a conventional spell check program 270 and related spelling database, and a conventional grammar check program 280 and related grammar database. As discussed below in conjunction with FIGS. 4A through 4C, the spelling database or the grammar database may be updated by the present invention to reflect a new usage as determined by an Internet search. In addition, as discussed further below in conjunction with FIGS. 5A through 5E, the data storage device 215 includes a dispatch thread message queue 290 for sending messages to a dispatch thread manager in the multithreaded environment of the present invention, and an inter-process communication (IPC) message queue 295 for sending IPC messages between processes in accordance with the present invention.

As discussed further below in conjunction with FIG. 3, the data storage device 215 also includes a process identifier (PID) database 300 that stores information on each process created by the operating system. In addition, the data storage device 215 and/or ROM 220 are operable to store one or more programs that the CPU 210 is operable to retrieve, interpret and execute. As shown in FIG. 2 and discussed further below in conjunction with FIGS. 5A through 5E and FIGS. 6A and 6B, respectively, the data storage device 215 also includes a supplemental search process 500 and an expert finder process 600. The word processing application program 400, together with the supplemental search process 500, or the expert finder process 600, directs the CPU 210 to operate in accordance with the present invention, and particularly in accordance with the methods described in detail herein.

Generally, the word processing application program 400 directs the CPU 210 to launch the supplemental search process 500 (i) when a supplemental search is requested by a user on a given topic, or (ii) automatically, to evaluate the usage of an apparently improper data element that fails to satisfy the requirements of the spelling or grammar databases 270, 280. The expert finder process 600 runs in the background to automatically determine if a document being created corresponds to one or more predefined categories, and, if so, to optionally provide the document to an expert in said identified category for review.

The word processing application program 400, the supplemental search process 500, and/or the expert finder process 600 may each include program elements that may be necessary, such as "device drivers" for allowing the CPU 210 to interface, for example, with the output device 250 and other computer peripheral devices (not shown). Appropriate device drivers and other necessary program elements are known to those skilled in the art, and need not be described in detail herein.

As will be understood by those skilled in the art, the schematic illustration and accompanying description of the process identifier (PID) database 300 presented herein is an exemplary arrangement for stored representations of information to illustrate the principles of the invention. A number of other arrangements and informational content may be employed, as would be apparent to a person of ordinary skill in the art.

As shown in FIG. 3, the process identifier (PID) database 300 typically includes a plurality of records, such as records 305, 310, 315, 320 and 325, each associated with a different active process. For each active process identified by a PID in field 330, the process identifier (PID) database 300 includes a description of the process type in field 335, a task in field 340 and an identification of the assigned memory segment in field 345.

For example, records 310 and 325 correspond to two versions of a browser program 110 that have been created by the operating system in accordance with the present invention. The version of the browser program 110 associated with record 310 corresponds to a first "data searching" embodiment of the invention, where the user has initiated a search on a specified data element. The version of the browser program 110 associated with record 325 corresponds to a second "evaluate usage" embodiment of the invention, where a supplemental search is performed automatically to determine the number of occurrences on the Internet of an apparently misspelled term.

As previously indicated, the word processing application program 400, shown in FIG. 4, launches the supplemental search process 500 (FIGS. 5A through 5E) (i) when a supplemental search is requested by a user on a given topic, or (ii) automatically, to evaluate the usage of an apparently improper data element that fails to satisfy the requirements of the spelling or grammar databases 270, 280 or another set of conditions. In addition, the word processing application program 400 processes the results of the supplemental search that are returned by the browser 110.

Figure 4A:
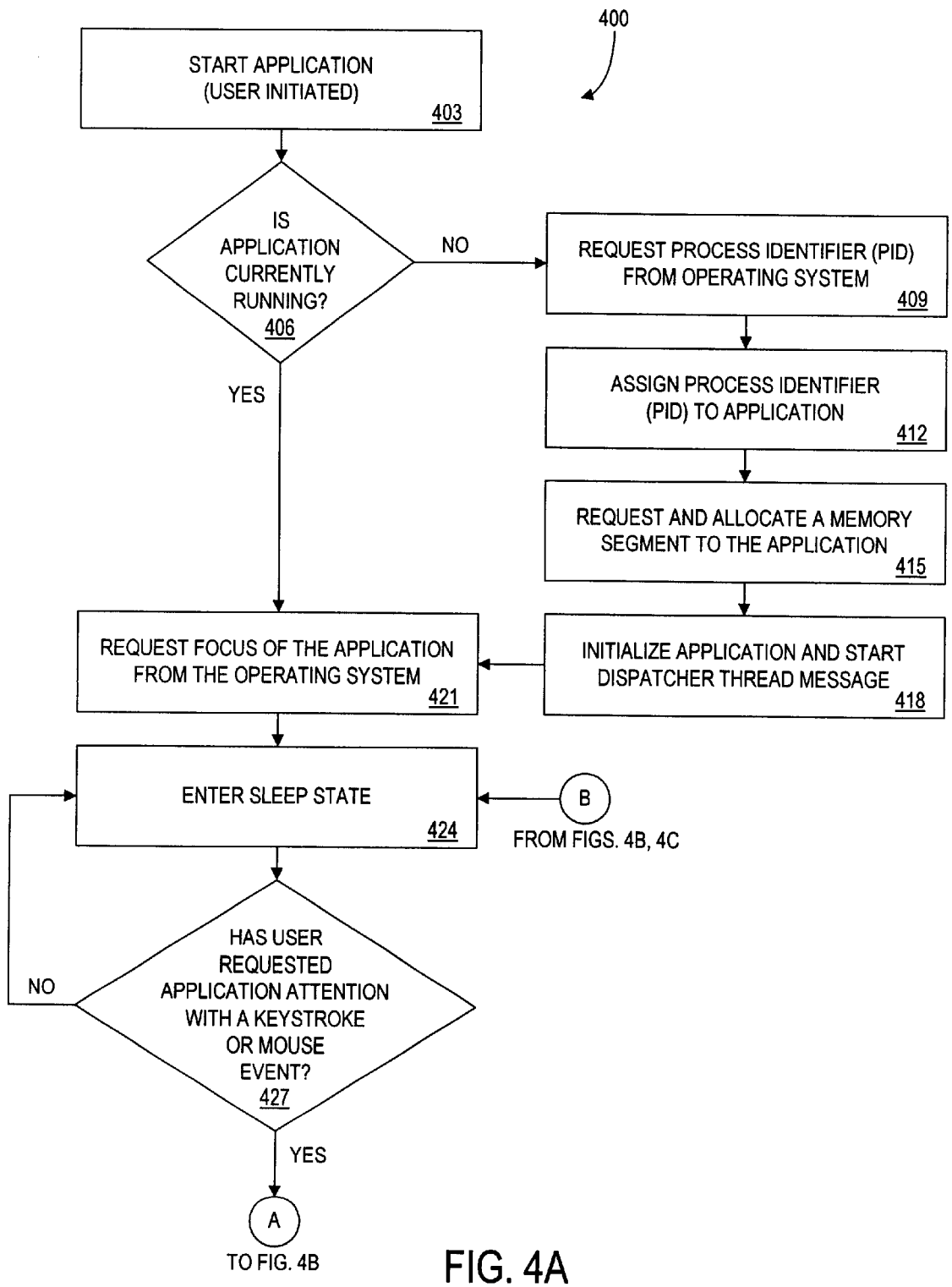
FIGS. 4A through 4C, collectively, are a flow chart illustrating an exemplary word processing application program implemented by the user computing device of FIG. 2.

As shown in FIG. 4A, the word processing application program 400 is generally launched during step 403 when a user starts or executes the word processing application program 400. A test is performed during step 406 to determine if a version of the application is already running. If it is determined during step 406 that a version of the application is not already running, then the application must create a version of the application and requests a process identifier during step 409 from the operating system. The application is assigned a process identifier during step 412, and the operating system records the process identifier in the process identifier (PID) database 300. The application then requests and is allocated a memory segment during step 415. The memory segment allocation is likewise recorded in the process identifier (PID) database 300. The application goes through an initialization phase during step 418, such as resetting counters, zeroing out memory and resetting variable values, before starting a dispatcher thread manager.

If, however, it is determined during step 406 that that a version of the application is already running, then the application requests the focus from the operating system (i.e., requests to be brought to the foreground) during step 421. Thus, the application that was just started (or was already running) is now the active window.

The word processing application program 400 then enters a sleep state during step 424 until it is detected during step 427 that the user has requested the attention of the application with a keystroke or mouse event. In this manner, the application program 400 does not waste system resources by unnecessarily taking CPU cycles away from other applications. Once a keystroke or mouse event is detected during step 427, the event will be trapped and acted upon.

Figure 4B:
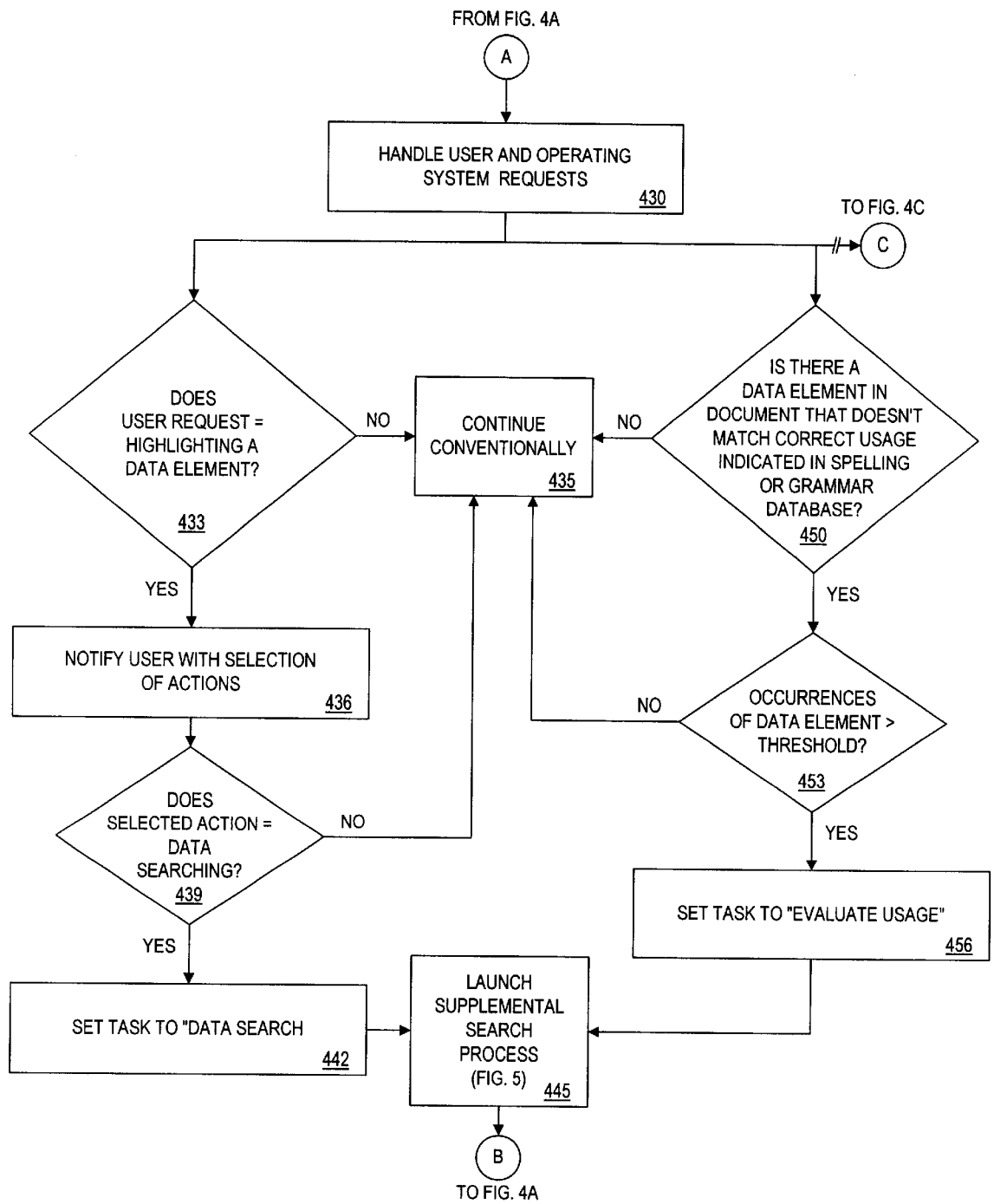
Figure 4C:
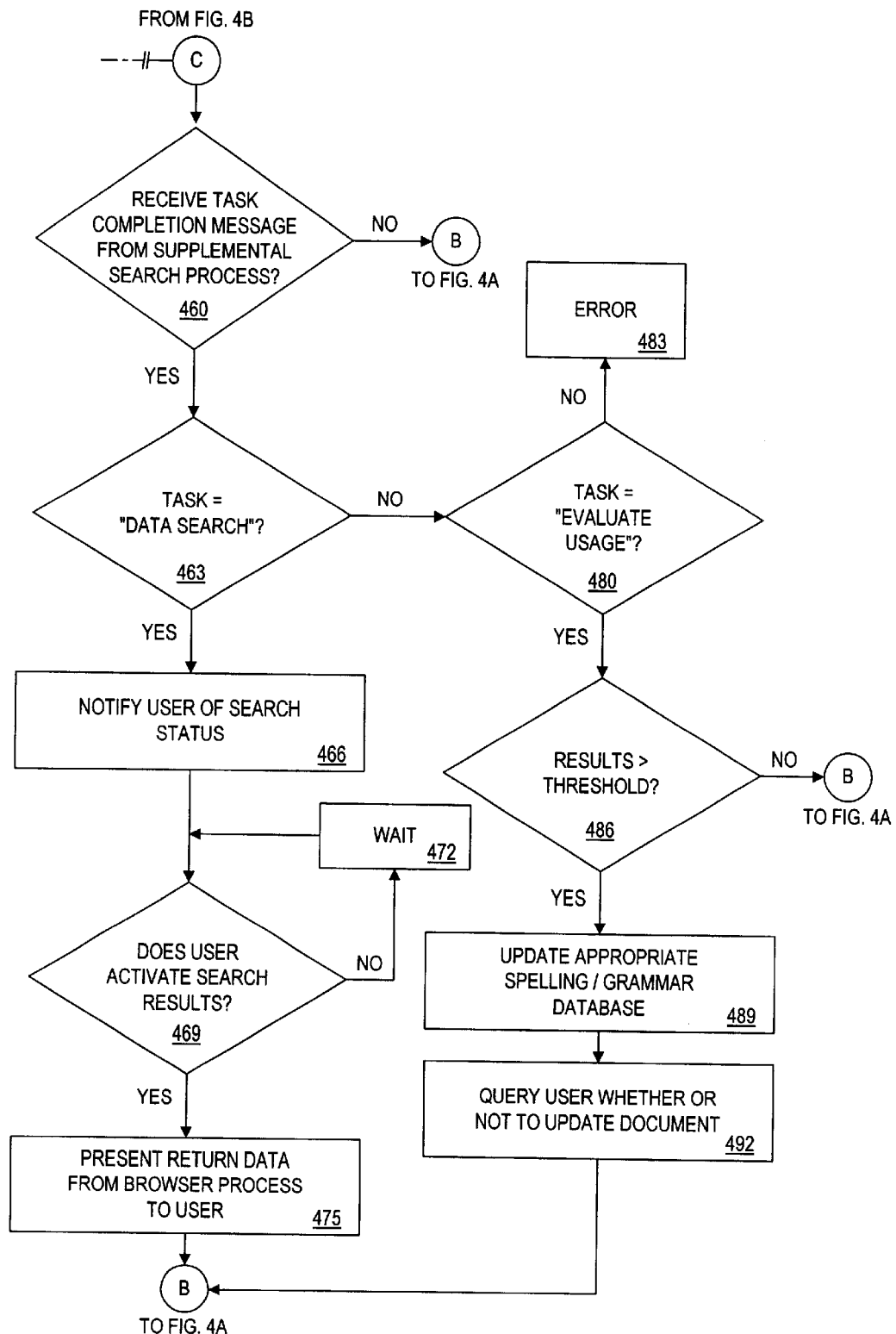

The user request associated with the keystroke or mouse event, or an operating system request associated with an operating system message is then handled during step 430 (FIG. 4B). The user request processed during step 430 may be, for example, to display characters on the screen, to save a file, to copy and paste data, to find or replace text, or to print or preview a document. The processing of user or operating system requests associated with the present invention are shown in FIGS. 4B and 4C.

As shown in FIG. 4B, a test is performed during step 433 to determine if the user request consists of the highlighting of text by the user. If it is determined during step 433 that the user request does not consist of highlighting text, then processing continues in a conventional manner during step 435. If, however, it is determined during step 433 that the user request does consist of highlighting text, then the user is notified during step 436 of the various actions that are possible on selected text. It is noted that a user may select text, for example, by holding down the shift key and moving the arrow to cover the desired text, or holding down the left mouse button and moving the mouse to highlight the desired text.

A test is performed during step 439 to determine if the selected action is data searching in accordance with the present invention. It is noted that the user can click on the "data searching" option with the left mouse button, or can move up or down the list of various actions until the "data searching" option is highlighted and then depress the enter key. If it is determined during step 439 that the selected action is not data searching, then processing continues in a conventional manner during step 435. If, however, it is determined during step 439 that the selected action is data searching, then a task variable is set to "data searching" during step 442.

According to a feature of the present invention, the word processing application program 400 will then utilize multi-threading technology to return control of the word processing application program 400 to the user at step 424, while simultaneously spawning a background thread to handle the "data searching" task performed by the supplemental search process 500. Thus, as shown in FIG. 4B, the word processing application program 400 launches the supplemental search process 500 during step 445, while simultaneously returning control of the word processing application program 400 to step 424.

As shown in FIG. 4B, another test is periodically performed in the background during step 450 to determine if there is a data element in the document that does not match the correct usage requirements indicated in either the spelling or grammar databases associated with the word processing application program 400. If it is determined during step 450 that all the data elements in the document match the correct usage requirements indicated in either the spelling or grammar databases, then processing continues in a conventional manner during step 435.

If, however, it is determined during step 450 that a data element in the document does not match the correct usage requirements indicated in either the spelling or grammar databases, then a further test is performed during step 453 to determine if the number of occurrences of the apparently improper data element in the document exceed a predefined threshold. It is noted that the threshold acts as a filter that may be predefined or specified by the user to prevent a supplemental search from being performed unnecessarily. In this manner, the threshold can be set relatively high, to eliminate hypersensitivity and to allow for a more conservative use of language in a document. Likewise, the thresholds can be set low, such as one occurrence, to perform a supplemental search on any data element that does not satisfy the requirements of the spelling or grammar checking programs.

In addition, the thresholds can be dynamically established based upon the user's skill and accuracy as a speller or writer. For example, a user making many errors that are detected and corrected by the spelling or grammar checking programs might establish high thresholds to avoid unnecessary supplemental searches on the Internet for words that are likely misspelled. The word processing application program 400 may also be configured such that only words with the ".com" extension are searched over the Internet. In a further variation, the word processing application program 400 can detect the over-use of a word or term such that the supplemental search accesses a thesaurus to identify words with similar meanings.

If it is determined during step 453 that the number of occurrences of the data element in the document does not exceed the predefined threshold, then processing continues in a conventional manner during step 435. If, however, it is determined during step 453 that the number of occurrences of the data element in the document exceed the predefined threshold, then the task variable is set to "evaluate usage" during step 456. Thereafter, the word processing application program 400 will utilize multithreading technology to return control of the word processing application program 400 to the user at step 424, while simultaneously spawning a background thread to handle the "evaluate usage" task performed by the supplemental search process 500. Thus, as shown in FIG. 4B, the word processing application program 400 launches the supplemental search process 500 during step 445, while simultaneously returning control of the word processing application program 400 to step 424. For example, if a data element is apparently misspelled in the document, the supplemental search process 500 will determine the number of occurrences of the same apparent misspelling on the Internet.

The operation of the supplemental search process 500 will be discussed below in conjunction with FIGS. 5A through 5E. After the supplemental search process 500 has completed either the "data searching" or "evaluate usage" tasks, the word processing application program 400 must process the results. Thus, as shown in FIG. 4C, the word processing application program 400 will periodically perform a test during step 460 to determine if the word processing application program 400 has received any task completion messages from the supplemental search process 500. If it is determined during step 460 that no task completion messages have been received, then program control will return to step 424 (FIG. 4A).

If, however, it is determined during step 460 that a task completion message has been received from the supplemental search process 500, then a further test is performed during step 463 to determine if the task associated with the message is a "data search" task. If it is determined during step 463 that the task associated with the message is a "data search" task, then the user is notified of the search status during step 466. For example, the word processing application program 400 can display a "pop-up" window (or dialog box) or a status indicator on the status bar or a toolbar to the user. A test is performed during step 469 to determine if the user activates the search results, for example, by clicking on the "view results" button in a "pop-up" window or clicking on a corresponding icon in the toolbar. If it is determined during step 469 that the user has not yet activated the search results, then the word processing application program 400 will wait during step 472 until the user activates the results.

If, however, it is determined during step 469 that the user has activated the search results, then the user is presented with the data returned by the browser program 110 during step 475, before program control returns to step 424 (FIG. 4A).

If, however, it is determined during step 463 that the task associated with the message is a not "data search" task, then a further test is performed during step 480 to determine if the task associated with the message is an "evaluate usage" task. If it is determined during step 480 that the task associated with the message is not an "evaluate usage" task, then an unknown task completion message has been received and an error message is passed to an error handling routine during step 483, which will notify the user of the problem.

If, however, it is determined during step 480 that the task associated with the message is an "evaluate usage" task, then a further test is performed during step 486 to determine if the search results indicate that the apparently incorrect data element has been used on the Internet more than a threshold number of times. If it is determined during step 486 that the results do not exceed the predefined threshold, then program control returns to step 424 (FIG. 4A).

If, however, it is determined during step 486 that the results do exceed the predefined threshold, then the appropriate spelling or grammar database is optionally updated during step 489, and the user is queried during step 492 to determine if one or more of the instances of the data element should be updated in the document. Thereafter, program control returns to step 424 (FIG. 4A).

Figure 5A:
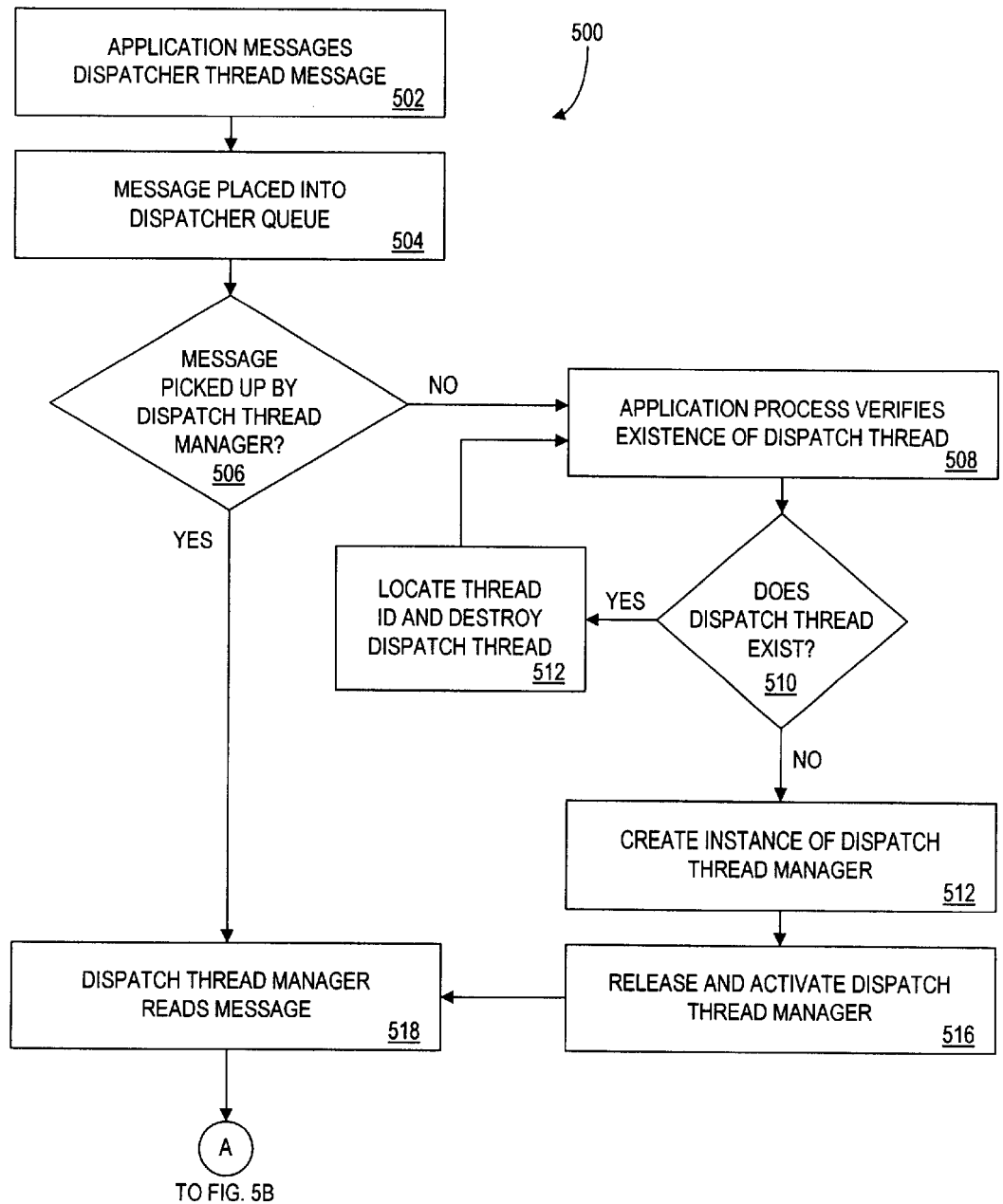
FIGS. 5A through 5E, collectively, are a flow chart illustrating an exemplary supplemental search process implemented by the user computing device of FIG. 2, and FIGS. 6A and 6B, collectively, are a flow chart illustrating an exemplary expert finder process implemented by the user computing device of FIG. 2.
Figure 5B:
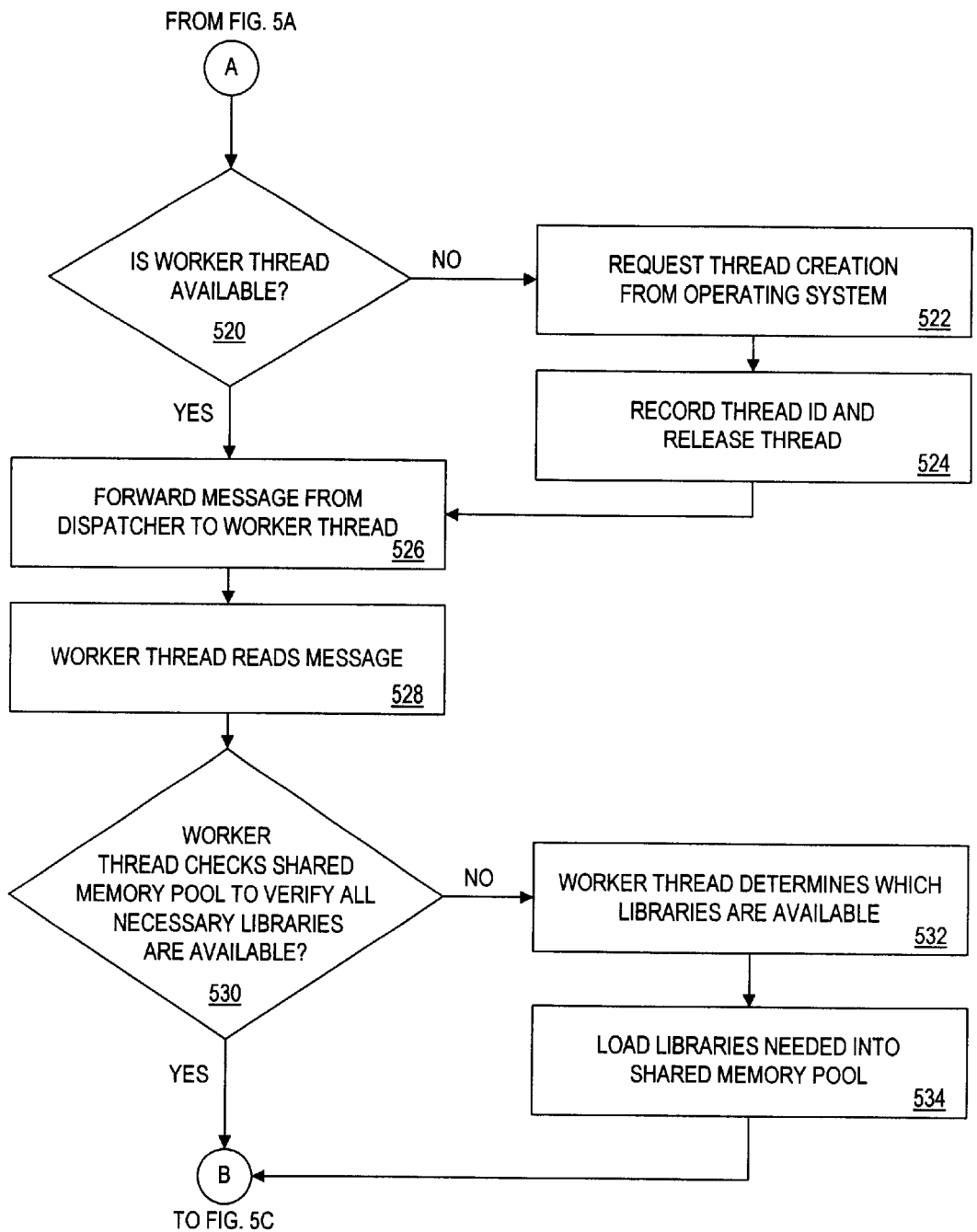

As previously indicated, the word processing application program 400, shown in FIG. 4, launches the supplemental search process 500, shown in FIGS. 5A through 5E, (i) when a supplemental search is requested by a user on a given topic, or (ii) automatically, to evaluate the usage of an apparently improper data element that fails to satisfy the requirements of the spelling or grammar databases 270, 280. As shown in FIG. 5A, the word processing application program 400 initially sends a message to the dispatcher thread manager during step 502 to make the dispatcher thread manager aware of a new task that needs attention. The message is placed in the dispatcher thread message queue 290 (FIG. 2) during step 504. In this manner, the word processing application program 400 can queue up requests for the dispatcher thread manager and the dispatcher thread manager can take requests, for example, using a first-in-first-out (FIFO) protocol.

A test is performed during step 506 to determine if the message is retrieved from the queue 290 by the dispatcher thread manager. If it is determined during step 506 that the message is not retrieved by the dispatcher thread manager, then the word processing application program 400 contacts the operating system during step 508 to verify the existence of the dispatcher thread manager. The operating system performs a test during step 510 to determine if the dispatcher thread manager exists. If it is determined during step 510 that the dispatcher thread manager does exist, then the dispatcher thread manager must be in a run-away state and the operating system locates the thread identifier to destroy the dispatch thread during step 512. If, however, it is determined during step 510 that the dispatcher thread manager does not exist, then the application 400 contacts the operating system to start the creation of a new thread during step 514. A new dispatcher thread manager is created during step 516 and released to the application for use.

Thereafter, the dispatcher thread manager reads the message in the queue during step 518 and determines what task to perform. A test is performed by the dispatcher thread manager during step 520 (FIG. 5B) to determine if a worker thread is available. If it is determined during step 520 that a worker thread is not available, then the dispatcher thread manager requests a thread from the operating system during step 522, records the thread identifier and releases the thread during step 524.

If, however, it is determined during step 520 that a worker thread is already available (or after creation and release of a thread during steps 522 and 524), then the dispatcher thread manager forwards the message received from the application 400 to the worker thread during step 526. The worker thread reads the message during step 528.

A test is performed by the worker thread during step 530 to determine if the libraries required to complete the designated task are available. If it is determined during step 530 that all the libraries required to complete the designated task are not available, then the worker thread determines which libraries are needed during step 532, and loads the libraries into the shared memory pool during step 534.

Figure 5C:
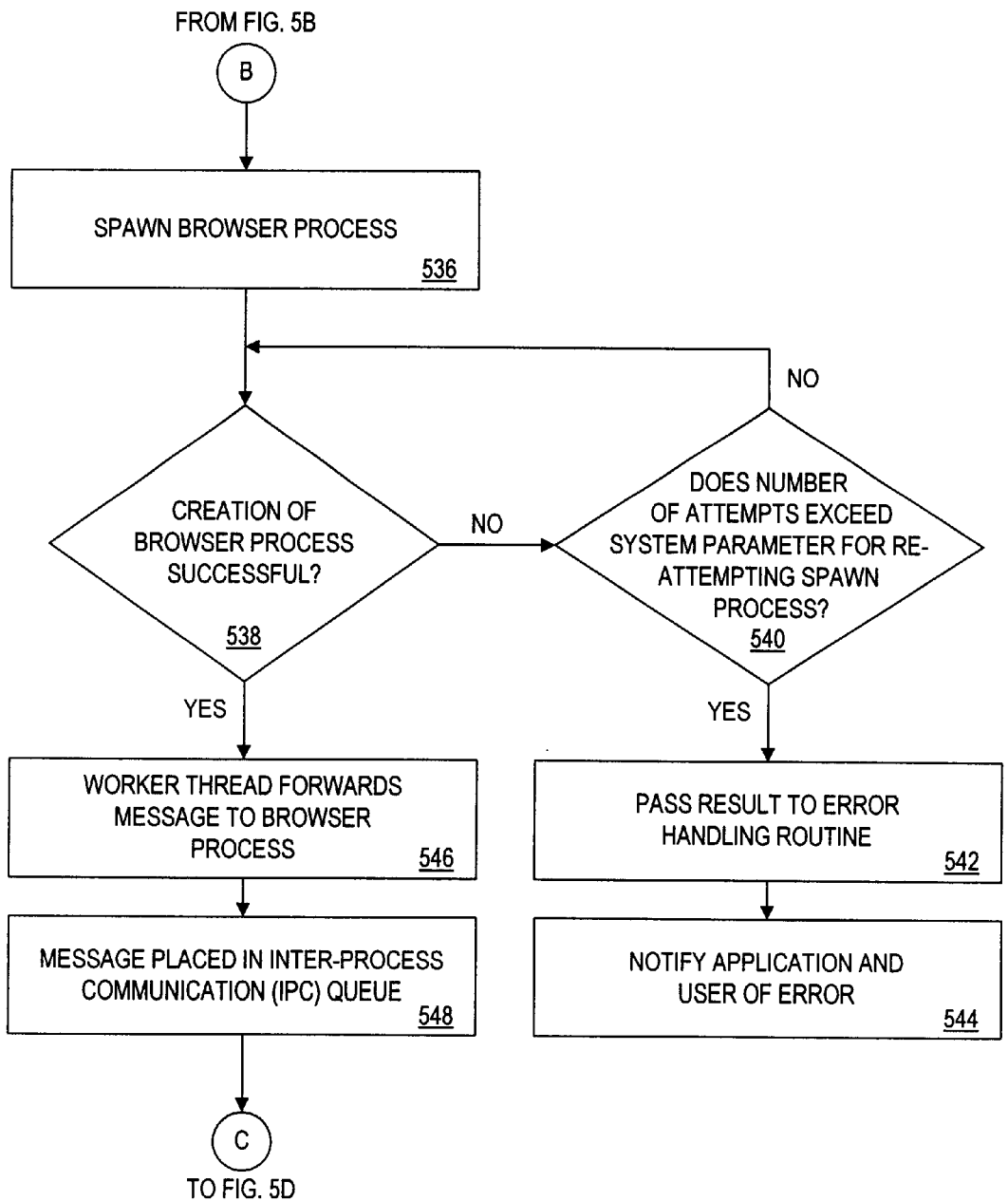
Figure 5D:
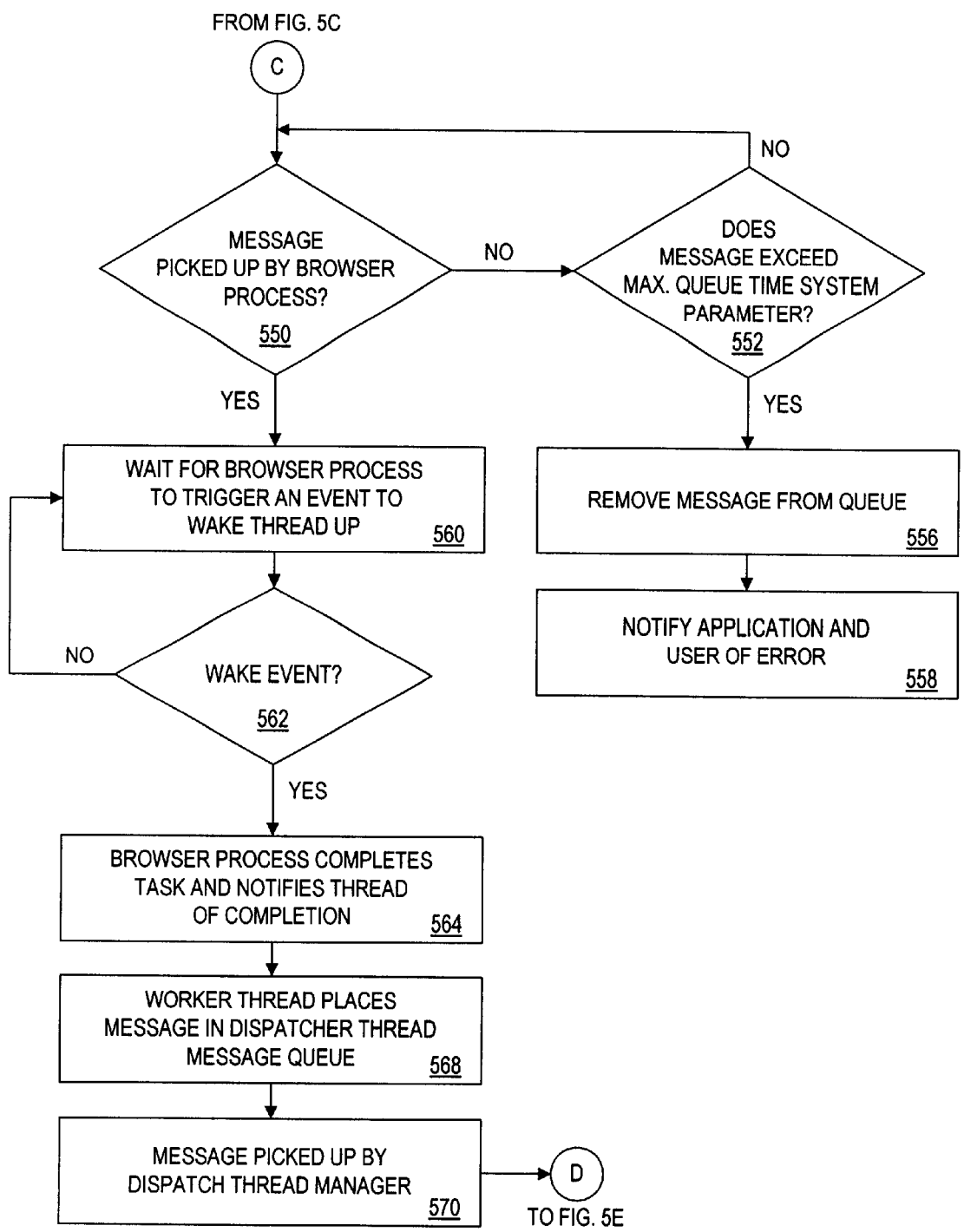

If it is determined during step 530 that all the libraries required to complete the designated task are available (or after the appropriate libraries have been loaded during steps 532 and 534), then the browser program 110 is spawned during step 536 (FIG. 5C). The worker thread performs a test during step 538 to determine if the browser program 110 is successfully spawned. For example, if the worker thread cannot record the process identifier of the browser, then the spawning process has likely failed.

If it is determined during step 538 that the browser program 110 has not been successfully spawned, then the worker thread can attempt to spawn the browser again, until a maximum number of retries is detected during step 540. If it is determined during step 540 that the maximum number of retries has been attempted, then the result is passed to an error handling routine during step 542, and the user and application 400 are notified of the error during step 544.

If it is determined during step 538 that the browser program 110 has been successfully spawned, then the worker thread forwards the message received from the dispatcher thread manager to the browser program 110 during step 546, using inter-process communication (IPC) techniques. Thus, the message is placed in the IPC message queue 295 during step 548. The message may indicate the search term to the browser program it, for example, in the form of a well-known binary query. It is noted that searching performed by the browser 110 can be geographically restricted to account for different languages and dialects.

The worker thread periodically checks the IPC queue 295 during steps 550 through 554 to-ensure that messages are picked up by the appropriate processes. Thus, a test is performed during step 550 to determine if messages are picked up from the IPC queue 295. If it is determined during step 552 that a message is not picked up from the queue 295 within a predefined period of time, then the message is removed from the queue during step 556 and the result is passed to an error handling routine for notification of the user and application 400 during step 558.

If, however, it is determined during step 550 that messages are picked up from the IPC queue 295, then the worker thread will wait during step 560 until the browser program 110 triggers an event to "awaken" the worker thread. In other words, the worker thread checks the message queue for new messages. If the worker thread finds a new message, the worker thread will act on it. Otherwise, the worker thread goes into a sleep state until a new message indicating that the browser program has completed its task is received.

Thus, a test is performed during step 562 to determine if the worker thread detects a wake event (task completion message). Once it is determined during step 562 that a task completion message is received from the browser program, the worker thread is notified during step 564. The browser places the task completion message in the worker thread queue with the browser's PID, so that a particular worker thread can determine what task was requested of the browser program by doing a PID data lookup to see what information was recorded before the spawning process for this particular task.

The worker thread verifies the integrity of the data in the task completion message and places the task completion message in the dispatcher thread message queue 290 during step 568, to notify of the task completion. If the message is not picked up within a predefined period of time, then the message is re-queued. If after a predefined number of retries, the message is not retrieved from the message queue, then the worker thread must pass an error message to the error handling routine for reporting to the user and application process 400.

Figure 5E:
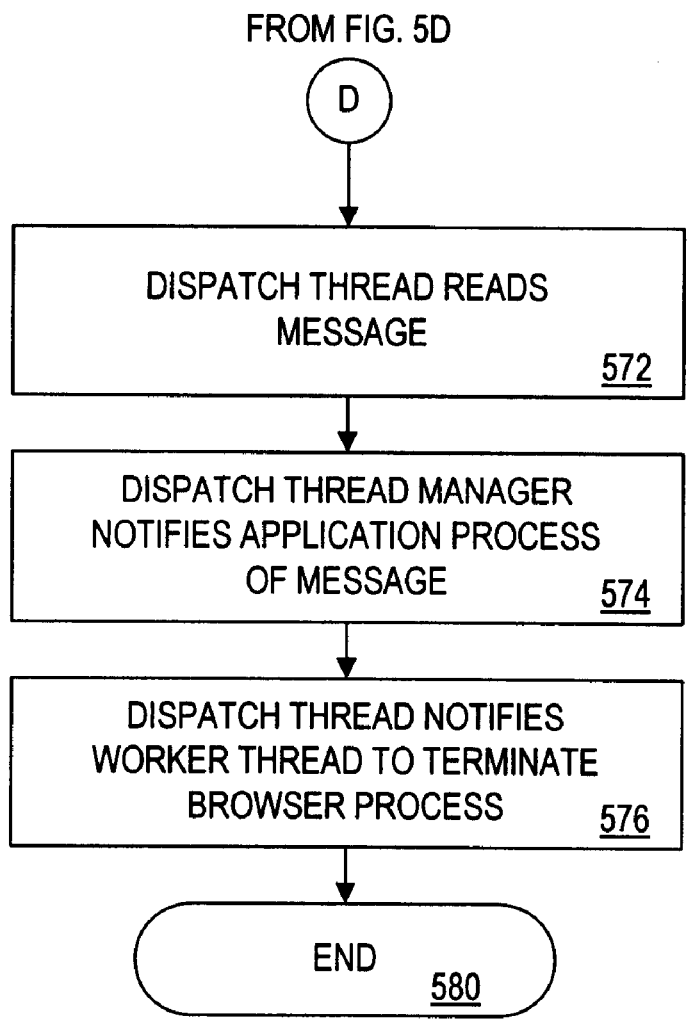

The message is retrieved by the dispatcher thread manager during step 570, and the dispatcher thread manager reads the message during step 572 (FIG. 5E). The dispatcher thread manager notifies the word processing application program 400 of the task completion message during step 574, with an indication of the requested task. Finally, the dispatcher thread manager places a message into the worker thread queue during step 576 to terminate the browser program 110 associated with the completed task. The worker thread uses the recorded PID to identify and then terminate the appropriate browser program 110. The worker thread sends a message to the operating system to terminate the browser program and reclaim the associated resources, such as memory and CPU cycles. Program control of the supplemental search process 500 terminates during step 580.

Figure 6A:
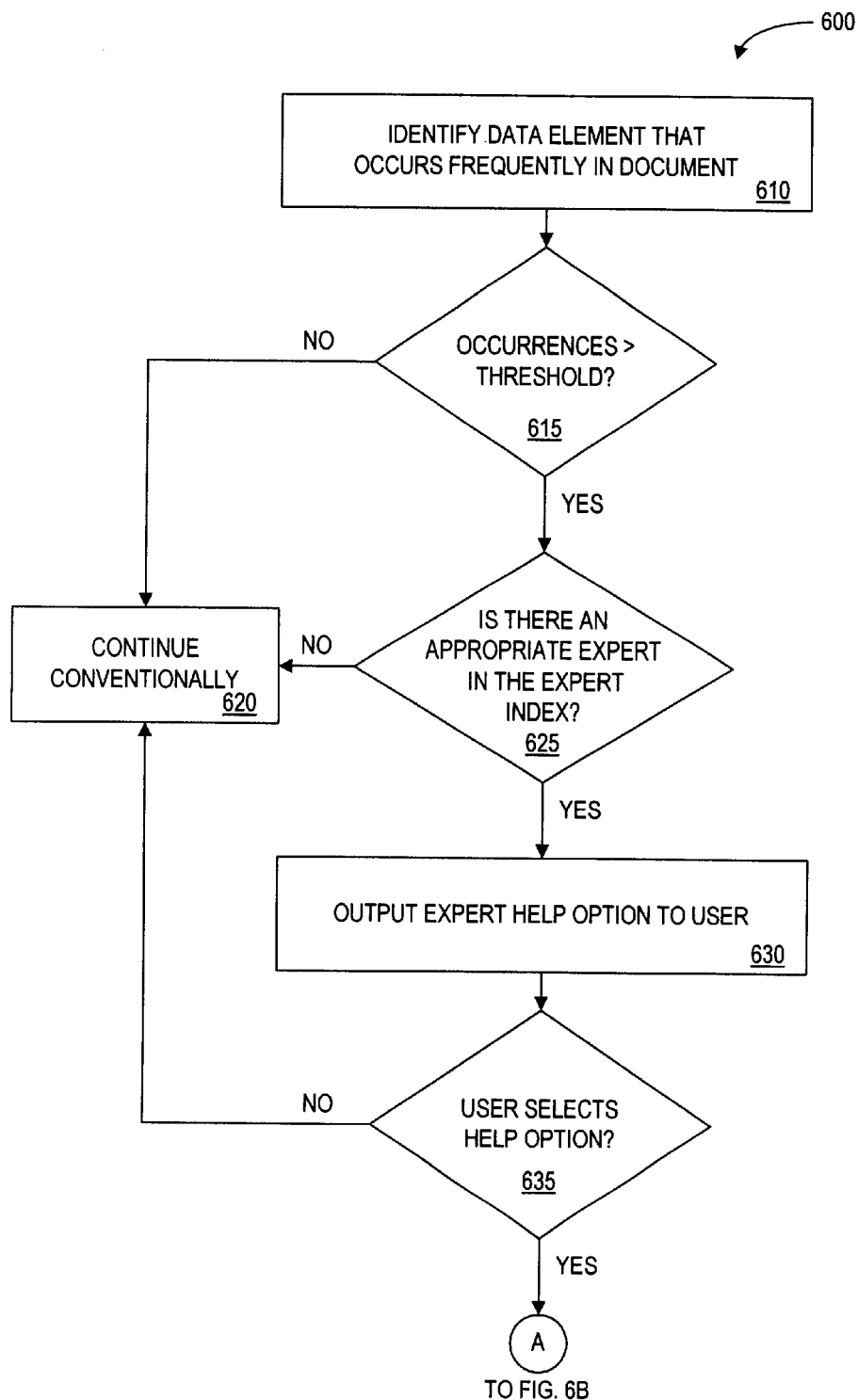
Figure 6B:
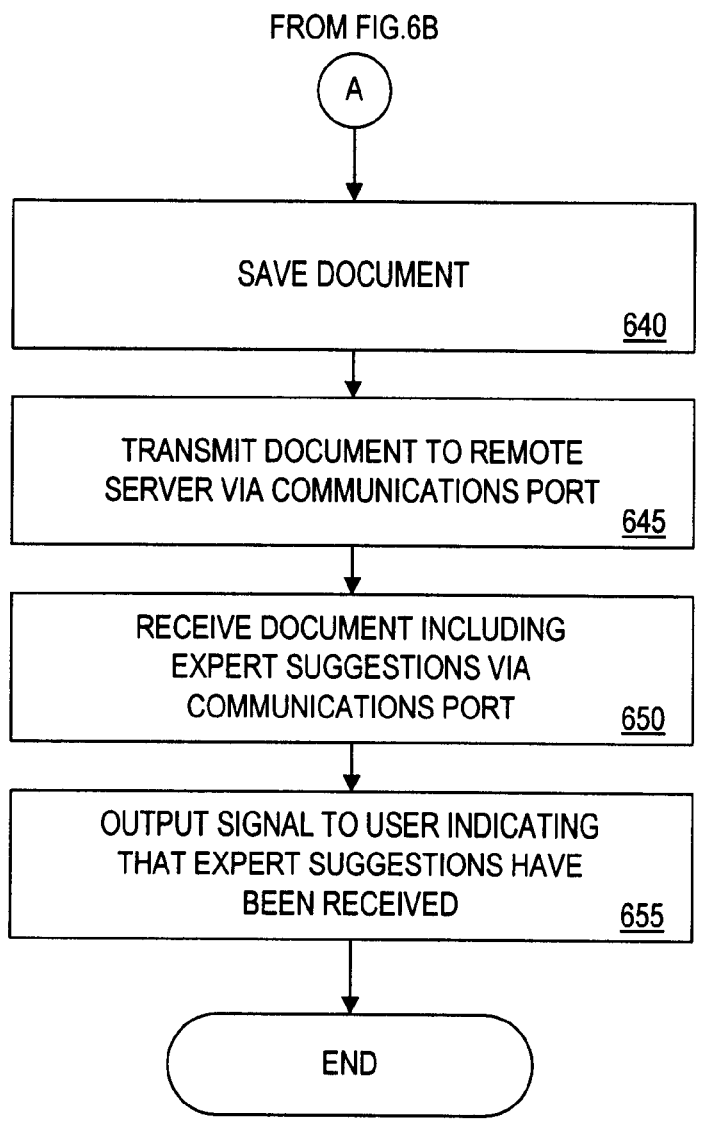

As previously indicated, the expert finder process 600, shown in FIGS. 6BA and 6B, runs in the background to automatically determine if a document being created corresponds to one or more predefined categories, and, if so, to optionally provide the document to an expert in said identified category for review. The expert finder process 600 may be executed periodically, or intermittently, for example, each time a document is saved or printed. The expert can be contacted using the methods and apparatus disclosed, for example, in U.S. patent application Ser. No. 09/112,131 now pending, entitled "Method and Apparatus for a Cryptographically Assisted Commercial Network System Designed to Facilitate and Support Expert-Based Commerce," filed Jul. 8, 1998 and assigned to the assignee of the present invention and incorporated by reference herein.

As shown in FIG. 6A, the expert finder process 600 initially identifies one or more data elements occurring frequently in a document the user is creating. A test is performed during step 615 to determine if the data element occurs in the document more than a threshold number of times. If it is determined during step 615 that the data element does not occur more than a threshold number of times, then processing continues conventionally during step 620.

If, however, it is determined during step 615 that the data element does occur more than a threshold number of times, then a further test is performed during step 625 to determine if there is an appropriate expert in an expert index (not shown) corresponding to the topic associated with the identified data element. If it is determined during step 625, that there is no appropriate expert, then processing continues conventionally during step 620.

If, however, it is determined during step 625 that there is an appropriate expert, then the user is given the option during step 630 to provide the document to the identified expert. A further test is then performed during step 635 to determine if the user selects the expert help option. If it is determined during step 635 that the user does not select the expert help option, then processing continues conventionally during step 620.

If, however, it is determined during step 635 that the user does select the expert help option, then the document is saved during step 640 (FIG. 6B). The document is then transmitted to a remote server associated with the expert by means of the communication port 260 during step 645. After the expert review is complete, the document including the expert's suggestions is then received during step 650 by means of the communication port 260.

Finally, an output signal is provided to the user during step 655 indicating that the expert suggestions are available for review, before program control terminates.

In a further variation, the present invention can be utilized to compare the relative usage of two terms on the Internet. For example, the user can initiate a search performed in the background in accordance with the present invention that returns the number of occurrences of the word "colour" versus the number of occurrences of the word "color." Thereafter, the user can utilize the search results to select one of the words, or the present invention can automatically select the word with the higher number of occurrences.

In another variation, a user can insert a code or placemarker into a document in accordance with the present invention indicating that a search should be initiated to obtain a missing piece of information. For example, a user can type the phrase "Priceline.com issued @X airline tickets during 1998" into a document, with the @X code indicating that a piece of information is missing. The present invention will automatically formulate a search using natural language techniques and obtain the desired data from the Internet. Thereafter, the user can utilize the search results to complete the missing information, or the present invention can automatically enter the found data.

It is to be understood that the embodiments and variations shown and described herein are merely illustrative of the principles of this invention and that various modifications may be implemented by those skilled in the art without departing from the scope and spirit of the invention. For example, there are other ways to indicate data elements besides highlighting the data element.

We claim:

1. A method for searching a database, comprising the steps of:

operating a first application program, the first application program being selected from a group consisting of a word processing program, a spreadsheet program and a database management program;

receiving a command from a user during operation of the first application program to initiate a search of a selected search term, said search being launched from said first application program and said search being performed on a background thread on said database over a network;

initiating said search using a search tool responsive to said received command without preempting said fist application program; and providing access to results of said search to said user.

2. The method according to claim 1, wherein said search tool is a browser.

3. The method according to claim 1, wherein said first application program executes on a first thread in a multi-threaded environment and said search tool executes on a background thread.

4. The method according to claim 1, wherein said search is performed on the Internet.

5. The method according to claim 1, wherein said search is performed on a proprietary network.

6. The method according to claim 1, wherein said search is performed on a dedicated database.

7. The method according to claim 1, wherein said search is performed on a publicly accessible database.

8. The method according to claim 1, wherein said user is notified of said search results by means of a dialog box.

9. The method according to claim 1, wherein said user is notified of said search results by means of an icon presented on a toolbar.

10. A method for searching a database, comprising the steps of:

operating a first application program, the first application program being selected from a group consisting of a word processing program, a spreadsheet program and a database management program;

receiving a command from a user during operation of the first application program to initiate a search of a selected search term, said search being launched from said first application program and said search being performed on a background thread on said database over a network using a search tool;

initiating said search using a background thread using said search tool responsive to said received command while said first application program maintains control; and providing access to results of said search to said user.

11. The method according to claim 10, wherein said search tool is a browser.

12. The method according to claim 10, wherein said first application program executes on a first thread in a multi-threaded environment and said search tool executes on a background thread.

13. The method according to claim 10, wherein said search is performed on a publicly accessible database.

14. The method according to claim 10, wherein said user is notified of said search results by means of a dialog box.

15. The method according to claim 10, wherein said user is notified of said search results by means of an icon presented on a toolbar.

16. A system for searching a database, comprising:

a memory for storing computer-readable code; and a processor operatively coupled to said memory, said processor configured to:

operate a first application program, the first application program being selected from a group consisting of a word processing program, a spreadsheet program and a database management program, receive a command from a user during operation of the first application program to initiate a search of a selected search term, said search being launched from said first application program and said search being performed on a background thread on said database over a network;

initiate said search using a search tool responsive to said received command without preempting said first application program; and provide access to results of said search to said user.

17. A system for searching a database, comprising:

a memory for storing computer-readable code; and a processor operatively coupled to said memory, said processor configured to:

operate a first application program, the first application program being selected from a group consisting of a word processing program, a spreadsheet program and a database management program;

receive a command from a user during operation of the first application program to initiate a search of a selected search term, said search being launched from said first application program and said search being performed on a background thread on said database over a network using a search tool;

initiate said search using a background spread using said search tool responsive to said received command while said first application program maintains control; and provide access to results of said search to said user.

18. A method for searching a database, comprising the steps of:

selecting a search term in a document of a first application program said first application program being selected from a group consisting of a word processing program, a spreadsheet program and a database management program;

initiating from said first application program, on a background thread over a network, a search of said search term using a search tool, while continuing to work in said document while said search is performed; and receiving access to results of said search.

19. The method according to claim 18, wherein said search tool is a browser.

20. The method according to claim 18, wherein said first application program executes on a first thread in a multi-threaded environment and said search tool executes on a background thread.

21. The method according to claim 18, wherein said search is performed on a publicly accessible database.

22. The method according to claim 18, wherein said receiving step comprises the step of being notified of said search results by means of a dialog box.

23. The method according to claim 18, wherein said receiving step comprises the step of being notified of said search results by means of an icon presented on a toolbar.

24. A method for searching a database, comprising the steps of:

selecting a search term in a document of a first application program said first application program being selected from a group consisting of a word processing program, a spreadsheet program and a database management program;

initiating from said first application program, on a background thread over a network, a search of said search term using a search tool, while said first application program maintains control; and receiving access to results of said search.

25. The method according to claim 24, wherein said search tool is a browser.

26. The method according to claim 24, wherein said first application program executes on a first thread in a multi-threaded environment and said search tool executes on a background thread.

27. The method according to claim 24, wherein said first application program is selected from the group consisting essentially of a word processing program, a spreadsheet program and a database management program.

28. The method according to claim 24, wherein said search is performed on a publicly accessible database.

29. The method according to claim 24, wherein said receiving step comprises the step of being notified of said search results by means of a dialog box.

30. The method according to claim 24, wherein said receiving step comprises the step of being notified of said search results by means of an icon presented on a toolbar.

31. A method for searching a database, comprising the steps of:

operating a first application program, the first application program being selected from a group consisting of a word processing program, a spreadsheet program and a database management program;

determining if a predefined condition has occurred in the first application program;

initiating from the first application program, on a background thread over a network, a search in said database responsive to said predefined condition using a search tool without preempting said first application program; and providing access to results of said search to a user of said first application program.

32. The method according to claim 31, wherein said predefined condition is the occurrence of a data element in a document at least a predefined number of times.

33. The method according to claim 32, wherein said data element is an apparently misspelled term.

34. The method according to claim 33, further comprising the step of updating a spelling dictionary with the apparently misspelled term if said search results detect the occurrence of said apparently misspelled term a predefined number of times.

35. The method according to claim 33, further comprising the step of determining if said user wishes to update said apparently misspelled term in said document.

36. The method according to claim 32, wherein said predefined number of times can be set by said user.

37. The method according to claim 32, wherein said data element is the occurrence of an apparent grammatical error.

38. The method according to claim 37, further comprising the step of updating a grammar database to reflect the apparent grammatical error if said search results detect the occurrence of said apparent grammatical error a predefined number of times.

39. The method according to claim 37, further comprising the step of determining if said user wishes to update said apparent grammatical error in said document.

40. The method according to claim 31, wherein said search is performed on a thesaurus database containing similar terms to said data element.

41. The method according to claim 31, wherein said search tool is a browser.

42. The method according to claim 31, wherein said first application program executes on a first thread in a multi-threaded environment and said search tool executes on a background thread.

43. The method according to claim 31, wherein said search is performed on a publicly accessible database.

44. The method according to claim 31, wherein said user is notified of said search results by means of a dialog box.

45. The method according to claim 31, wherein said user is notified of said search results by means of an icon presented on a toolbar.

46. A method for searching a database, comprising the steps of:
    operating a first application program, the first application program being selected from a group consisting of a word processing program, a spreadsheet program and a database management program;
    determining if a predefined condition has occurred in the first application program;
    initiating from the first application program, on a background thread over a network, a search responsive to said predefined condition using a search tool executing on a background thread while said first application program maintains control; and
    providing access to results of said search to a user of said first application program.

47. The method according to claim 46, wherein said predefined condition is the occurrence of a data element in a document at least a predefined number of times.

48. The method according to claim 47, wherein said data element is an apparently misspelled term.

49. The method according to claim 48, further comprising the step of updating a spelling dictionary with the apparently misspelled term if said search results detect the occurrence of said apparently misspelled term a predefined number of times.

50. The method according to claim 46, further comprising the step of determining if said user wishes to update said apparently misspelled term in said document.

51. The method according to claim 47, wherein said predefined number of times can be set by said user.

52. The method according to claim 47, wherein said data element is the occurrence of an apparent grammatical error.

53. The method according to claim 52, further comprising the step of updating a grammar database to reflect the apparent grammatical error if said search results detect the occurrence of said apparent grammatical error a predefined number of times.

54. The method according to claim 52, further comprising the step of determining if said user wishes to update said apparent grammatical error in said document.

55. The method according to claim 47, wherein said search is performed on a thesaurus database containing similar terms to said data element.

56. The method according to claim 46, wherein said search tool is a browser.

57. The method according to claim 46, wherein said first application program executes on a first thread in a multi-threaded environment and said search tool executes on a background thread.

58. The method according to claim 46, wherein said search is performed on a publicly accessible database.

59. The method according to claim 46, wherein said user is notified of said search results by means of a dialog box.

60. The method according to claim 46, wherein said user is notified of said search results by means of an icon presented on a toolbar.

61. A system for searching a database, comprising:
    a memory for storing computer-readable code; and
    a processor operatively coupled to said memory, said processor configured to:
        operate a first application program, the first application program being selected from a group consisting of a word processing program, a spreadsheet program and a database management program;
        determine if a predefined condition has occurred in the first application program;
        initiate from the first application program, on a background thread over a network, a search in said database responsive to said predefined condition using a search tool without preempting said first application program; and
    provide access to results of said search to a user of said first application program.

62. A system for searching a database, comprising:
    a memory for storing computer-readable code; and
    a processor operatively coupled to said memory, said processor configured to:
        operate a first application program, the first application program being selected from a group consisting of a word processing program, a spreadsheet program and a database management program;
        determine if a predefined condition bas occurred in the first application program;
        initiate from the first application program, over a network, a search responsive to said predefine condition using a search tool executing on a background thread while said first application program maintains control; and
    provide access to results of said search to a user of said first application program.

63. A method for searching a database, comprising the steps of:
    determining if a document of a first application program is related to one or more predefined categories by launching a search from the first application program on a background thread over a network;
    providing said document to an expert of said category for review; and
    providing results of said review to a user.

64. The method according to claim 63, wherein said providing step requires the approval of said user.

65. The method according to claim 63, further comprising the step of guaranteeing payment to said expert for reviewing said document.

66. The method according to claim 63, further comprising the step of requiring said user to guarantee payment of said expert.

67. The method according to claim 63, further comprising the step of requiring said user to prepay for said expert review.

68. The method according to claim 63, wherein said expert is identified by accessing a database indicating one or more experts for each of said predefined categories.

69. The method according to claim 63, wherein said expert is identified by one or more additional experts.

70. A system for searching a database, comprising:
    a memory for storing computer-readable code; and
    a processor operatively coupled to said memory, said processor configured to:
        determine if a document of a first application program is related to one or more predefined categories by launching a search from the first application program on a background thread over a network;

provide sad document to an expert of said category for review; and provide results of said review to a user.

71. An article of manufacture comprising:

a computer readable medium having computer readable code means embodied thereon, said computer readable program code means comprising:

a step to operate a first application program, the first application program being selected from a group consisting of a word processing program, a spreadsheet program and a database management program;

a step to receive a command from a user during operation of the first application program to initiate a search of a selected search term, said search being performed on said database;

a step to initiate from the first application program, on a background thread over a network, said search using a search tool responsive to said received command without preempting said first application program; and a step to provide access to results of said search to said user.

72. An article of manufacture comprising:

a computer readable medium having computer readable code means embodied thereon, said computer readable program code means comprising:

a step to operate a first application program, the first application program being selected from a group consisting of a word processing program, a spreadsheet program and a database management program;

a step to receive a command from a user during operation of the first application program to initiate a search of a selected search term, said search being performed on said database using a search tool;

a step to initiate from the first application program, on a background thread over a network, said search using a background thread using said search tool responsive to said received command while said first application program maintains control; and a step to provide access to results of said search to said user.

73. An article of manufacture comprising:

a computer readable medium having computer readable code means embodied thereon, said computer readable program code means comprising:

a step to operate a first application program the first application program being selected from a group consisting of a word processing program, a spreadsheet program and a database management program;

a step to determine if a predefined condition has occurred in the first application program;

a step to initiate from the first application program, on a background thread over a network, a search in said database responsive to said predefined condition using a search tool without preempting said first application program; and a step to provide access to results of said search to a user of said first application program.

74. An article of manufacture comprising:

a computer readable medium having computer readable code means embodied thereon, said computer readable program code means comprising:

a step to operate a first application program, the first application program being selected from a group consisting of a word processing program, a spreadsheet program and a database management program;

a step to determine if a predefined condition has occurred in the first application program;

a step to initiate from the first application program, on a background thread over a network, a search responsive to said predefined condition using a search tool executing on a background thread while said first application program maintains control; and a step to provide access to results of said search to a user of said first application program.

75. An article of manufacture comprising:

a computer readable medium having computer readable code means embodied thereon, said computer readable program code means comprising:

a step to determine if a document of a first application program is related to one or more predefined categories by launching a search from the first application program on a background thread over a network;

a step to provide said document to an expert of said category for review; and a step to provide results of said review to a user.

76. A method for searching a database, comprising the steps of:

operating a first application program that is not a browser;

receiving a command from a user during operation of the first application program to initiate a search of a selected search term, said search being performed on said database;

initiating from the first application program, on a background thread over a network, said search using a search tool responsive to said received command without preempting said first application program; and providing access to results of said search to said user.

* * * * *

UNITED STATES PATENT AND TRADEMARK OFFICE
CERTIFICATE OF CORRECTION

PATENT NO. : 6,349,295 B1
DATED : February 19, 2002
INVENTOR(S) : Tedesco et al.

It is certified that error appears in the above-identified patent and that said Letters Patent is hereby corrected as shown below:

Column 14,
Line 10, please replace the instance of "fist" with -- first --.

Signed and Sealed this

Sixteenth Day of August, 2005

JON W. DUDAS
*Director of the United States Patent and Trademark Office*